(12) United States Patent
Zhang

(10) Patent No.: US 12,621,297 B2
(45) Date of Patent: May 5, 2026

(54) DATA PROCESSING METHOD, DEVICE, AND APPARATUS, AND STORAGE MEDIUM

(71) Applicant: Lenovo (Beijing) Limited, Beijing (CN)

(72) Inventor: Ning Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 367 days.

(21) Appl. No.: 18/184,356

(22) Filed: Mar. 15, 2023

(65) Prior Publication Data

US 2023/0403273 A1 Dec. 14, 2023

(30) Foreign Application Priority Data

Jun. 10, 2022 (CN) .......................... 202210654185.2

(51) Int. Cl.
*H04L 9/40* (2022.01)
(52) U.S. Cl.
CPC ................................. *H04L 63/0876* (2013.01)
(58) Field of Classification Search
CPC .... H04L 63/0876; H04L 63/101; H04L 63/08
See application file for complete search history.

(56) References Cited

U.S. PATENT DOCUMENTS

| | | | | |
|---|---|---|---|---|
| 2007/0143488 A1* | 6/2007 | Pantalone | ............... | H04L 63/08 709/227 |
| 2011/0258682 A1* | 10/2011 | Yin | ..................... | H04L 65/1093 726/22 |
| 2014/0230044 A1* | 8/2014 | Liu | ......................... | H04L 41/28 726/15 |
| 2015/0046988 A1* | 2/2015 | Suzuki | ................... | H04L 51/08 726/6 |
| 2022/0174118 A1* | 6/2022 | Schulert | ............... | H04L 67/142 |

* cited by examiner

*Primary Examiner* — Khoi V Le

(74) *Attorney, Agent, or Firm* — ANOVA LAW GROUP, PLLC

(57) ABSTRACT

A data processing method applied to a service terminal includes receiving an authorization request sent by a target client terminal. The authorization request includes target path information of the target client terminal. The method further includes searching for a target identifier matching the target path information in an authorization list including at least one authorization identifier. The authorization identifier is generated at least based on network path information of an authorized client terminal. The method further includes sending the target identifier to the target client terminal to cause the target client terminal to control a target application to run according to the target identifier.

13 Claims, 4 Drawing Sheets

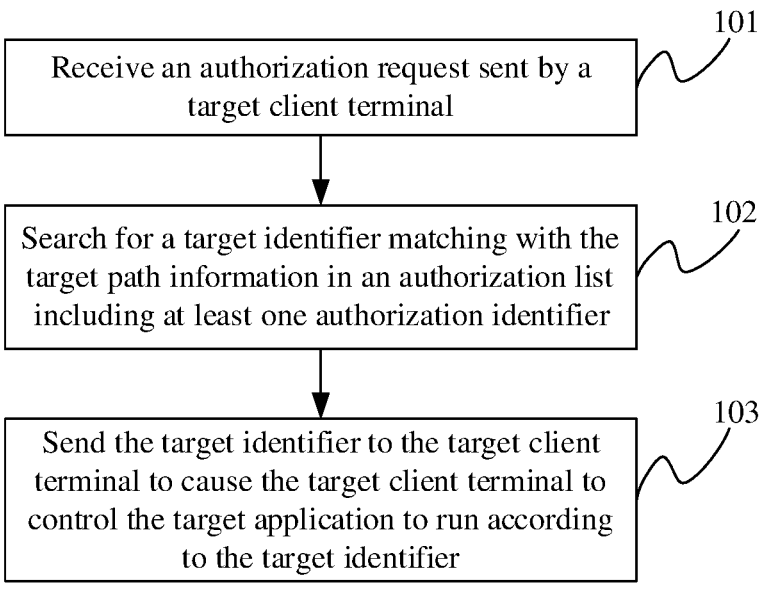

101

Receive an authorization request sent by a target client terminal

102

Search for a target identifier matching with the target path information in an authorization list including at least one authorization identifier

103

Send the target identifier to the target client terminal to cause the target client terminal to control the target application to run according to the target identifier

FIG. 1

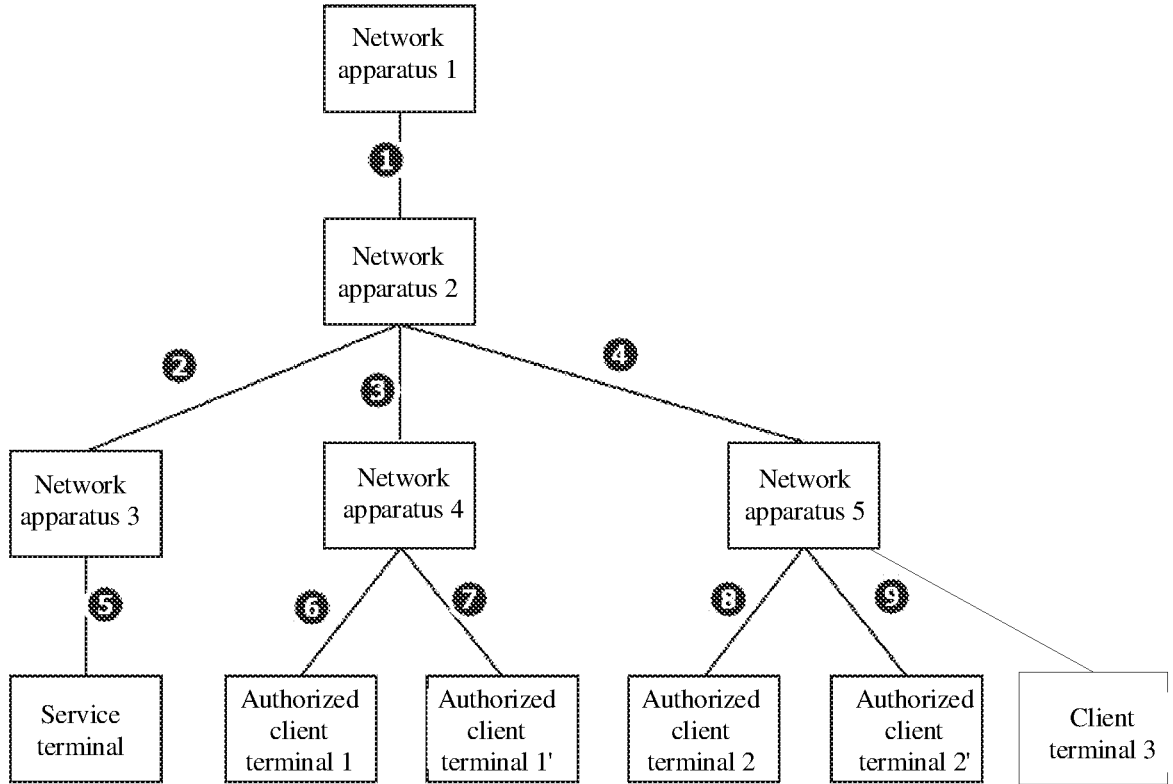

FIG. 2

DATA PROCESSING METHOD, DEVICE, AND APPARATUS, AND STORAGE MEDIUM

CROSS-REFERENCE TO RELATED APPLICATION

This application claims priority to Chinese Patent Application No. 202210654185.2, filed on Jun. 10, 2022, the entire content of which is incorporated herein by reference.

TECHNICAL FIELD

The present disclosure relates to the computer technology field and, more particularly, to a data processing method and a device.

BACKGROUND

A software authorization mode is when a software provider generates an authorization identifier according to a machine code of an electronic apparatus. The machine code is generated according to a serial number of a hardware member of the electronic apparatus. The machine code is unique for each electronic apparatus. Thus, the software provider can limit access permission of the electronic apparatus for software with the authorization identifier generated according to the machine code.

However, in a virtual environment such as a container or a virtual machine, most apparatuses that run the software are virtual apparatuses. The application can drift among different physical apparatuses. If an authorization identifier is still generated according to a machine code of a physical apparatus, the access permission of the software cannot be effectively managed.

SUMMARY

Embodiments of the present disclosure provide a data processing method applied to a service terminal. The method includes receiving an authorization request sent by a target client terminal. The authorization request includes target path information of the target client terminal. The method further includes searching for a target identifier matching the target path information in an authorization list including at least one authorization identifier. The authorization identifier is generated at least based on network path information of an authorized client terminal. The method further includes sending the target identifier to the target client terminal to cause the target client terminal to control a target application to run according to the target identifier.

Embodiments of the present disclosure provide a data processing device applied to a service terminal, including a reception module, a search module, and a transmission module. The reception module is configured to receive an authorization request sent by the target terminal. The authorization request includes target path information of the target client terminal. The search module is configured to search for a target identifier matching the target path information in an authorization list including at least one authorization identifier. The authorization identifier is generated at least based on network path information of an authorized client terminal. The transmission module is configured to send the target identifier to the target client terminal to cause the target client terminal to control a target application to run according to the target identifier.

Embodiments of the present disclosure provide an electronic apparatus, including a processor and a memory. The memory stores a computer program that, when executed by the processor, causes the processor to receive an authorization request sent by the target terminal. The authorization request includes target path information of the target client terminal. The processor is further configured to search for a target identifier matching the target path information in an authorization list including at least one authorization identifier. The authorization identifier is generated at least based on network path information of an authorized client terminal. The processor is further configured to send the target identifier to the target client terminal to cause the target client terminal to control a target application to run according to the target identifier.

In the above technical solution, the data processing method and device are provided in the present disclosure. When the authorization request sent by the target client terminal is received, the target identifier matching the target path information can be searched for in the authorization list including at least one authorization identifier to send the searched target identifier to the target client terminal. Thus, the target client terminal can control the target application to run according to the target identifier. In the present disclosure, the authorization identifier can be generated based on the network path information determined by the location of the authorized client terminal in the network environment, which ensures the security of application authorization for running the application in the virtual environment such as the container or virtual machine.

BRIEF DESCRIPTION OF THE DRAWINGS

FIG. 1 illustrates a schematic flowchart of a data processing method according to embodiments of the present disclosure.

FIG. 2 illustrates a schematic structural diagram of an adaptive network according to embodiments of the present disclosure.

DETAILED DESCRIPTION OF THE EMBODIMENTS

Figure 3:
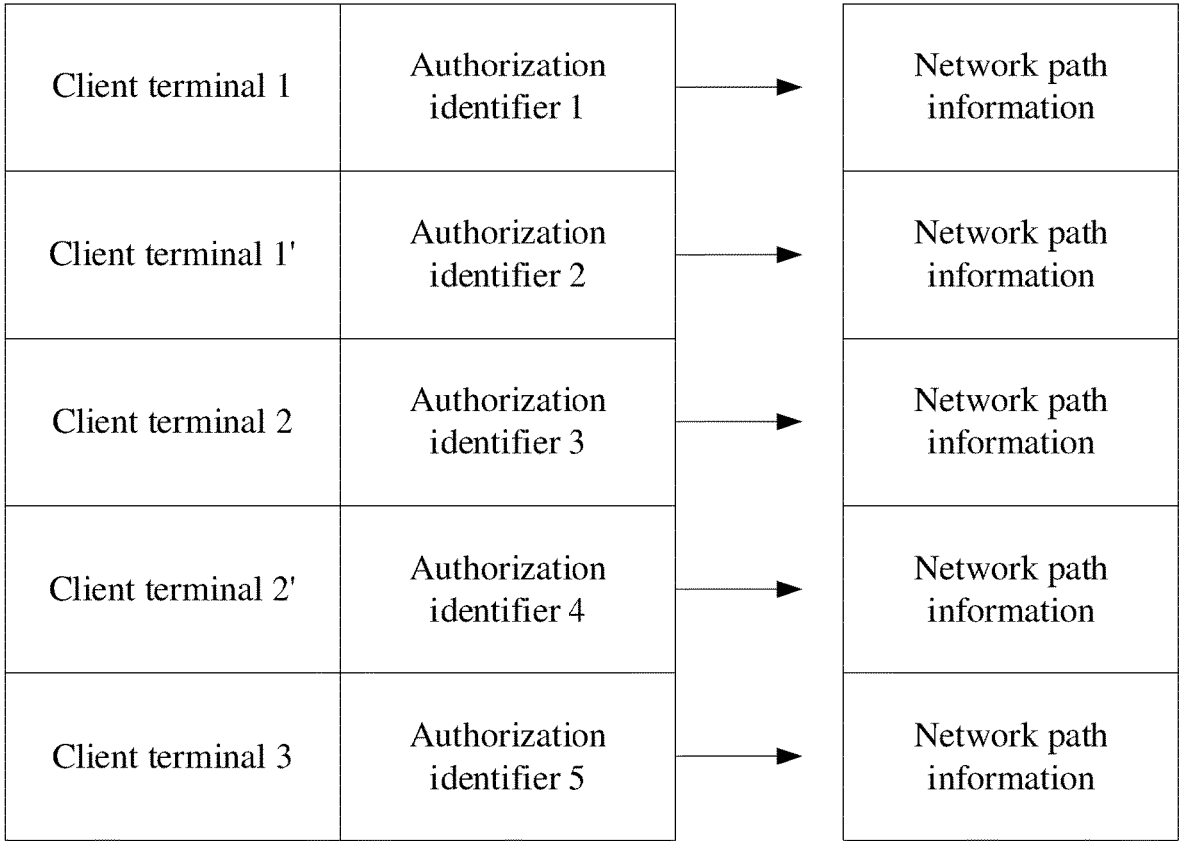
FIG. 3 illustrates a schematic diagram of an authorized list according to embodiments of the present disclosure.

The technical solutions of embodiments of the present disclosure are described in detail below in connection with the accompanying drawings of embodiments of the present disclosure. Described embodiments are only some embodiments of the present disclosure, not all embodiments. All other embodiments obtained by those of ordinary skill in the art without creative effort are within the scope of the present disclosure.

FIG. 1 illustrates a schematic flowchart of a data processing method according to embodiments of the present disclosure. The method can be applied to an electronic apparatus capable of performing data processing. The electronic apparatus can be configured as a service terminal. The service terminal can be in a same network structure as authorized client terminals. The service terminal and the client terminals can be environments when the application is running in a container or a virtual machine. The application can run in a container environment or virtual machine environment. One virtual machine system can include a plurality of containers. A plurality of applications can run in one container environment or one virtual machine environment. The service terminal and the client terminals of the present disclosure can be the environment when the application is running (i.e., running environment). The running environment can include packages and configurations needed for the application to run. The technical solution of embodiments of the present disclosure can be used to improve the security of the access permission.

In some embodiments, the method of embodiments of the present disclosure can include the following processes.

At 101, an authorization request sent by a target client terminal is received.

The authorization request can at least include target path information of the target client. The target path information can at least include identity information of network nodes connected in a network path from a target node to the target client. The target node can be a node determined from a common upper node of the target client terminal and the service terminal in the same network structure in which the target client and the service terminal are located. In some embodiments, the target node can be selected from a gateway node, a domain name resolution node, and a preset network node in a network where the target client and the service terminal are located. The gateway node can refer to a node apparatus used as the gateway in the network. The domain name resolution node can refer to a node apparatus configured to perform a domain name resolution function in the network. The preset network node can refer to a node apparatus that is pre-specified in the network. For example, the target client terminal can use a gateway node in the same network structure as the client terminal and the service terminal as a target node. When the authorization request is generated, identity information of network nodes connected to a network path from the target node to the target client terminal can be added to the authorization request as target path information.

The identity information of the network node is not limited to only one piece of network identification information such as an IP address, a gateway address, a DNS address, a gateway physical address, and a MAC address. The identity information of the network node can be the MAC address of the network node, the IP address of the network node, or a combination of the MAC address and the IP address of the network node when IP addresses are likely to overlap. Thus, the identity information of the network node can uniquely represent the network node in the network.

For example, as shown in FIG. 2, a client terminal 3 is used as a target client terminal. The client terminal 3 can obtain the network nodes in the network structure where the service terminal and the client terminal 3 are located through communication with the service terminal. Then, the network apparatus 1 (used as a gateway node) and the network apparatus 2 (used as a domain name resolution node) can be determined as common upper nodes of the client terminal 3 and the service terminal, thus, the service terminal can determine the network apparatus 1 as the target node, or pre-specify the gateway node (the network apparatus 1) as the target node. After the target node is determined as the network apparatus 1, the client terminal 3 can combine the MAC addresses and IP addresses of the network nodes connected in the network path from the network apparatus 1 to the client terminal 3. As shown in FIG. 2, after the combination, the MAC address and IP address of the network apparatus 1+the MAC address and IP address of the network apparatus 2+the MAC address and IP address of the network apparatus 5+the MAC address and the IP address of the client terminal 3 is obtained as the target path information of the client terminal 3. The target path information and the authorization request can be sent to the service terminal through the network.

In some embodiments, the target path information can include the identity information of the network nodes connected in the network path from the service terminal to the target client terminal. As shown in FIG. 2, the target path information of the client terminal 3 includes the MAC address and the IP address of the service terminal+the MAC address and the IP address of the network apparatus 3+the MAC address and the IP address of network apparatus 1+the MAC address and the IP address of the network apparatus 2+the MAC address and the IP address of the network apparatus 5+the MAC address and the IP address of the client terminal 3.

At 102, a target identifier matching with the target path information is searched in an authorization list including at least one authorization identifier.

The authorization identifier in the authorization list can be generated at least based on the network path information of the authorized client terminal. The authorized client terminal can be a running environment when the application runs in the container or the virtual machine.

In some embodiments, the authorization list can include authorization identifiers corresponding to one or more authorized client terminals. Each authorization identifier can correspond to the network path information of the corresponding authorized client terminal. As shown in FIG. 3, each authorization identifier corresponds to a piece of network path information.

Based on this, in some embodiments, the target path information of the target client terminal can be compared with each piece of network path information corresponding to each authorization identifier in the authorization list to search for the authorization identifier with the corresponding network path information matching the target path information. The found authorization identifier can be the target identifier.

In some embodiments, the target path information matching the network path information can include that at least some nodes of the network nodes corresponding to the target path information are consistent with the network nodes corresponding to the network path information. The network nodes corresponding to the target path information can include the target node.

In some other embodiments, the target path information matching the network path information can include that a portion of the identity information of the target path information matches the identity information of the network path information. The network nodes corresponding to the target path information can include the target node.

For example, taking the authorization list in FIG. 3 as an example, in some embodiments, the target path information including the Mac addresses and the IP addresses of the network apparatus 1, the network apparatus 2, the network apparatus 5 and the client terminal 3 is compared with the network path information corresponding to each authorization identifier in the authorization list. Then, the network path information corresponding to the authorization identifier 5 can be found to match the target path information. Thus, the authorization identifier 5 can be used as the target identifier.

At 103, the target identifier is at least sent to the target client terminal to cause the target client terminal to control the target application to run according to the target identifier.

In some embodiments, the target identifier can be sent to the target client terminal through the network path between the service terminal and the target client terminal. Thus, after the target client terminal receives the target identifier sent by the service terminal, the running permission of the target application at the target client terminal can be controlled according to the target identifier.

The target client terminal can control the target application to run according to the target identifier. In some embodiments, the target client terminal can perform verification on the target identifier. If the verification passes, the running permission for the target application can be obtained. Thus, the target application can be allowed to run at the target client terminal under the running permission. If the verification does not pass, the running permission for the target application cannot be obtained. Thus, the target application can be forbidden to run at the target client terminal.

In the data processing method of embodiments of the present disclosure, when the authorization request sent by the target client terminal is received, the target identifier matching the target path information of the target client terminal can be searched in the authorization list including at least one authorization identifier. Then, the searched target identifier can be sent to the target client terminal. Thus, the target client terminal can control the target application to run according to the target identifier. Since the network path information can represent the network environment where the authorized client terminal is located, the service terminal can generate the authorization identifier of the client terminal using the network path information of the authorized client terminal. Thus, the situation that the apparatus outside of the current network environment is illegally authorized can be avoided to improve the security of the access permission.

In some embodiments, the authorization identifier of the authorization list can be generated by calculating the network path information of the authorized client terminal and the network path information of the service terminal to obtain the authorization identifier of the authorized client terminal.

The network path information of the authorized client terminal can include the identity information of the network nodes connected in the network path from the target node to the authorized client terminal. The target node can include a node determined from the common upper nodes of the authorized client terminal and the service terminal. For the service terminal, each authorized client terminal can have a target node corresponding to the authorized client terminal. The target node can be determined from the network path from the service terminal to the authorized client terminal. Thus, the target node can represent a position of the authorized client terminal in the network. The target nodes corresponding to different authorized client terminals can be same or different. For example, as shown in FIG. 2, the service terminal determines the target node between the service terminal and the authorized client terminal. For example, the network apparatus 1 can be determined as the target node. Then, the authorized client terminal 1 can combine the MAC addresses and the IP addresses of the network nodes connected in the network path from the target node to the authorized client terminal 1 to obtain the network path information of the authorized client terminal 1. That is, a string obtained by combining the MAC addresses and the IP addresses of the network apparatus 1, the network apparatus 2, the network apparatus 4, and the authorized client terminal 1 can be used as the network path information. Then, the authorized client terminal 1 can send the network path information of the authorized client terminal 1 to the service terminal.

The network path information of the service terminal can include the identity information of the network nodes connected in the network path from the target node to the service terminal. For example, as shown in FIG. 2, in the network initialization process when the network is formed, the service terminal can combine the MAC addresses and the IP addresses of the network nodes connected in the network path from the target node to the service terminal to obtain the network path information of the service terminal corresponding to the authorized client terminal 1, that is the string obtained by combining the MAC addresses and the IP addresses of the network apparatus 1, network apparatus 2, network apparatus 3, and the service terminal. Then, the service terminal can perform computation on the network path information of the service terminal and the received network path information sent by the authorized client terminal 1 to obtain the authorization identifier corresponding to the authorized client terminal. Then, the authorization identifier of the authorized client terminal can be added to the authorization list.

In some embodiments, the service terminal performing the computation on the network path information of the authorized client terminal and the network path information of the service terminal can be implemented through the following processes.

Firstly, the service terminal can perform logical computation on the network path information of the authorized client terminal and the network path information of the service terminal to obtain a computation result. Then, the service terminal can perform system conversion on the computation result to obtain the authorization identifier of the authorized client terminal.

For example, in some embodiments, an exclusive NOR (XNOR) operation can be performed on the binary network path information of the authorized client terminal and binary network path information of the service terminal to obtain a binary string corresponding to the XNOR result bit that is continuously 1 in the binary network path information. Then, the obtained binary string can be converted into hexadecimal to obtain the authorization identifier of the authorized client terminal. That is, in some embodiments, first, binary conversion can be performed on the network path information of the authorized client terminal and the network path information of the service terminal. Then, the exclusive NOR operation can be performed on the two binary network path information to obtain the XNOR result. Then, the binary string corresponding to the XNOR result bit that is continuously 1 in the XNOR result can be intersected in the two binary network path information. Then, the hexadecimal conversion can be performed on the binary string to obtain the authorization identifier of the authorized client terminal.

For example, after the service terminal determines the target node, the service terminal can determine that the network path information of the service terminal is 1001 1101 0010 1000 and obtain the network path information of the client terminal, which is 1001 1101 0010 0100. Then, the exclusive NOR operation can be performed on the binary of the two pieces of the network path information. Starting from the first bit, bits of the XNOR result that is continuously 1 can be 1001 1101 0010. Then, effective bits can be the first 12 bits of the network path information. Then, the string 1001 1101 0010 corresponding to the bits of the exclusive NOR result that is continuously 1 in the network path information can be converted into a hexadecimal form 9D2, which is used as the authorization identifier.

The authorization identifier can also be referred to as a mask. The effective bits can represent the network environment where the client terminal is located. The effective bits being the first 12 bits can mean that bits of the head of the network path of the client terminal and bits of the head of the network path of the service terminal that are the same can be the first 12 bits. The 12 bits can be the identity information of the public node. If two client terminals have the same authorization identifier, upper nodes of the two client terminals can be the same, and the two client terminals can be in the same network environment.

Based on the above embodiments, in some embodiments, process 103 can be implemented in the following manner.

The target identifier and the target node corresponding to the target identifier can be sent to the target client terminal. Thus, the target client terminal can perform verification on the target identifier according to the target node and control the target application to run according to the obtained verification result.

Figure 4:
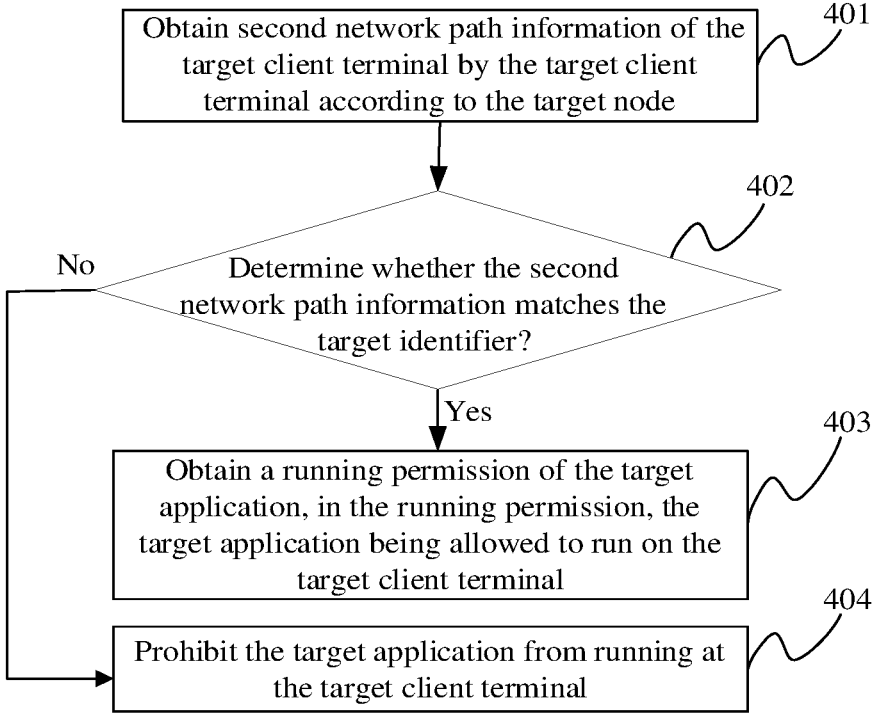
FIG. 4 illustrates a schematic flowchart showing a part of a data processing method according to embodiments of the present disclosure.

In some embodiments, as shown in FIG. 4, the target client terminal performing the verification on the target identifier according to the target node and controlling the target application to run according to the obtained verification result can be implemented in the following manner.

At 401, the target client terminal obtains second network path information of the target client terminal according to the target node.

The target client terminal cannot directly use the network path information (the network path information of the target client terminal is the target path information) as the second network path information. The second network path information can be the network path information obtained by performing the computation again, by the target client terminal, according to the target node sent with the target identifier. The process can include that the target client terminal can obtain the MAC addresses and the IP addresses of the network nodes connected in the network path from the target node to the target client terminal again according to the target node. Then, the target client terminal can combine the obtained MAC addresses and the IP addresses of the network nodes to obtain the second network path information of the target client terminal.

At 402, whether the second network path information matches the target identifier is determined. If the second network path information matches the target identifier, process 403 is performed. If the second network path information does not match the target identifier, process 404 is performed.

The second network path information matching the target identifier can indicate that the XOR operation is performed on the binary second network path information and the binary target identifier, and the XOR result bits are zero. Thus, the target identifier and the second network path can have the same head information.

According to the verification manner in process 402, the target identifier can be generated according to the network path information of the authorized client terminal. The network path information can be determined by the authorized client terminal according to the target node determined at the beginning period when the network is formed. Thus, the received target node sent with the target identifier can be used, and the second network path information can be calculated according to the target node to verify the authorization identifier at the authorized client terminal. As such, if the verification passes, it can be indicated that the position of the authorized client terminal is not changed in the network environment. Thus, an apparatus outside the network can be prevented from being illegally authorized.

At 403, a running permission of the target application is obtained. In the running permission, the target application is allowed to run on the target client terminal.

For example, the calculated second network path information can be compared with the received target identifier at the client terminal 3. If the calculated second network path information matches the received target identifier, the target identifier can be indicated to pass the verification. That is, the client terminal 3 can be a legal apparatus for running the target application. Thus, the client terminal 3 can obtain the running permission for the target application. The target application can be allowed to run at the client terminal 3.

At 404, the target application is prohibited from running at the target client terminal.

For example, the second network path information can be compared with the received target identifier at the client terminal 3. If the second network path information does not match the received target identifier, the target identifier does not pass the verification. Thus, the client terminal 3 cannot be a legal apparatus for running the target application. Therefore, the client terminal 3 cannot obtain the running permission for the target application. Thus, the target application can be prohibited from running at the client terminal 3.

For example, after receiving the target node, the client terminal 3 can determine that the second network path information of the client terminal 3 is 1001 1101 0010 0100 according to the target node. That is, the purpose of computing the path of the client terminal can be to determine whether the network environment changes. If the second network path information is the same as the previous network path information of the client terminal, it indicates that the network environment does not change, otherwise the network environment changes. Then, the binary form of the authorization identifier received by the client terminal 3 can be 1001 1101 0010. The XOR operation can be performed on the authorization identifier 1001 1101 0010 with the binary form of the second network path information 1001 1101 0010 0100. If the XOR results of the first 12 bits are 0, the first 12 bits can be the same, and the verification passes. That is, the head of the path information can be the same, the target node can be the same, and the network environment where the client terminal 3 is located can be the same.

For example, as shown in FIG. 2, if the network apparatus 1 and the network apparatus 2 are used as common nodes, the client terminals below the network apparatus 2 can have the same authorization identifier. Since the client terminals are in the same network environment (the upper common nodes are the same), the client terminals can have the same authorization identifier.

A method of issuing License can include the following processes. After an application provider issues a License using the authorization identifier (the authorization identifier is generated by the provider), the issued License (marked as LicenseFile) can be sent to each authorized client terminal. The LicenseFile can include the authorization identifier. After the authorization identifier passes the verification performed by the authorized client terminal, the authorized client terminal can obtain access permission for the application. However, in the present disclosure, the service terminal can be added to the above processes. That is, in the present disclosure, a network node can be searched from the network nodes in the same network structure and used as the service terminal. The rest of the network nodes can be the client terminals. The application provider can obtain the authorization identifier generated by the service terminal and issue the License using the authorization identifier. The issued License (marked as LicenseFile) can be sent to the service terminal. The LicenseFile can include the authorization identifier. The service terminal can perform the verification on the client terminals in the current network. The service terminal can send the authorization identifier to the client terminals. The client terminals can perform the verification on the authorization identifier.

Figure 5:
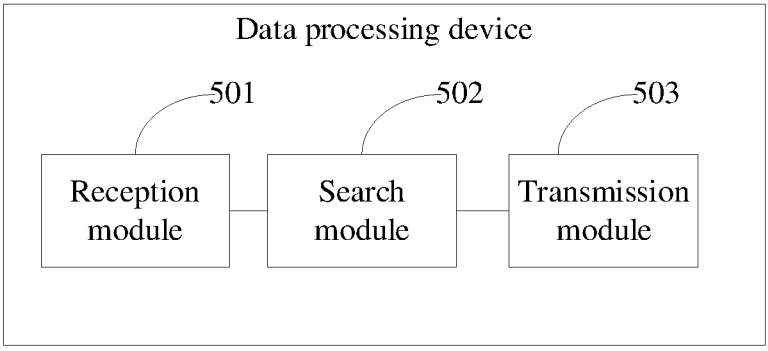
FIG. 5 illustrates a schematic structural diagram of a data processing device according to embodiments of the present disclosure.

FIG. 5 illustrates a schematic structural diagram of a data processing device according to embodiments of the present disclosure. The device can be configured at the service terminal, for example, the service terminal that is in the same network structure as the client terminals. The service terminal and the client terminal can be the running environments of the application running in the container or the virtual machine. The applications can run in the container or the virtual machine. One virtual machine can include a plurality of containers. A plurality of applications can run in one container environment or the virtual machine system. In the present disclosure, the service terminal and the client terminal can be the running environments of the above application. The running environment can refer to packages and configurations that are needed for running the application. The technical solution of the present disclosure is mainly used to improve the security of the access permission.

In some embodiments, the device includes a reception module 501, a search module 502, and a transmission module 503.

The reception module 501 can be configured to receive the authorization request sent by the target client terminal. The authorization request can at least include the target path information of the target client terminal.

The search module 502 can be configured to search the target identifier matching the target path information in the authorization list including at least one authorization identifier. The authorization identifier can be generated at least based on the network path information of the authorized client terminal.

The transmission module 503 can be configured to send at least the target identifier to the target client terminal to cause the target client terminal to control the target application to run according to the target identifier.

From the above solution, in the data processing device of embodiments of the present disclosure, when the authorization request sent by the target client terminal is received, the target identifier matching the target path information of the target client terminal can be searched in the authorization list including at least one authorization identifier. Then, the searched target identifier can be sent to the target client terminal. Thus, the target client terminal can control the target application to run according to the target identifier. In some embodiments, since the network path information can represent the network environment where the authorized client terminal is located, the apparatus outside the current network can be prevented from being illegally authorized to improve the security of the application authorization.

Figure 6:
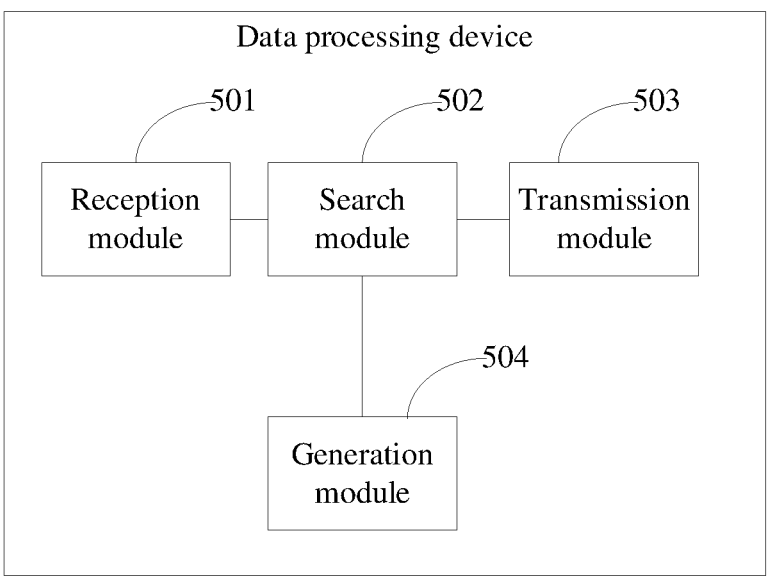
FIG. 6 illustrates a schematic structural diagram of another data processing device according to embodiments of the present disclosure.

In some embodiments, as shown in FIG. 6, the device further includes a generation module 504.

The generation module 504 can be configured to generate the authorization identifier. The authorization identifier can be generated by performing the computation on the network path information of the client terminal and the network path information of the service terminal to obtain the authorization identifier of the authorized client terminal.

The network path information of the authorized client terminal can include the identity information of the network nodes connected in the network path from the target node to the authorized client terminal.

The network path information of the service terminal can include the identity information of the network nodes connected in the network path from the target node to the service terminal.

The target node can be a node determined from the common upper nodes of the authorized client terminal and the service terminal.

In some embodiments, the transmission module 503 can be configured to send the target identifier and the target node corresponding to the target identifier to the target client terminal to cause the target client terminal to perform the verification on the target identifier according to the target node and control the target application to run according to the obtained verification result.

Based on the above solution, the target client terminal performing the verification on the target identifier according to the target node and controlling the target application to run according to the obtained verification result can include the following processes. The target client terminal can obtain the second network path information of the target client terminal according to the target node. Whether the second network path information matches the target identifier can be determined. If the second network path information matches the target identifier, the running permission for the target application can be obtained. Under the running permission, the target application can be allowed to run at the target client terminal.

In some embodiments, the target node can be selected from the gateway node, the domain name resolution node, and the preset network node in a network where the authorized client terminal and the service terminal are located.

In some embodiments, the generation module 504 can be configured to perform a logical operation on the network path information of the authorized client terminal and the network path information of the service terminal to obtain the operation result. The conversion can be performed on the operation result to obtain the authorization identifier of the authorized client terminal. For example, the generation module 504 can first perform the XNOR operation on the binary network path information of the client terminal and the binary network path information of the service terminal to obtain the binary string corresponding to the XNOR result bits of the binary network path information that are continuously 1. Then, the binary string can be converted into hexadecimal to obtain the authorization identifier of the authorized client terminal.

In some embodiments, the service terminal and authorized client terminal can be the running environments of the application running in the container or the virtual machine.

For specific implementation of the modules, reference can be made to the above embodiments, which is not repeated here.

Figure 7:
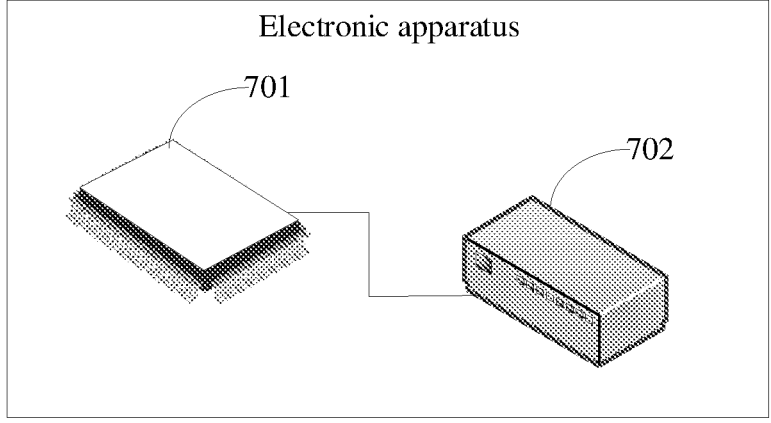
FIG. 7 illustrates a schematic structural diagram of an electronic apparatus according to embodiments of the present disclosure.

FIG. 7 illustrates a schematic structural diagram of an electronic apparatus according to embodiments of the present disclosure. The electronic apparatus can be an electronic apparatus capable of performing data processing, such as a service terminal that is in the same network structure as the client terminals. The service terminal and the client terminals can be the running environment of the application running in the container or the virtual machine. The technical solution of embodiments can be mainly used to improve the security of the application authorization.

In some embodiments, the electronic apparatus includes a memory 701 and a processor 702.

The memory 701 can be used to store a computer program and data generated by running the computer program.

The processor 702 can be configured to execute the computer program to receive the authorization request sent by the target client terminal. The authorization request at least can include the target path information of the target client terminal. The processor 702 can be configured to search for the target identifier matching the target path information in the authorization list including at least one authorization identifier. The authorization identifier can be generated at least based on the network path information of the authorized client terminal. The processor 702 can be further configured to send the target identifier to the target client terminal to cause the target client terminal to control the target application to run according to the target identifier.

Embodiments of the present disclosure provide the electronic apparatus. The electronic apparatus can be configured to search for the target identifier matching the target path information of the target client terminal in the authorization list including at least one authorization identifier when receiving the authorization request sent by the target client terminal. Then, the electronic apparatus can be configured to send the searched target identifier to the target client terminal. Thus, the target client terminal can control the target application to run according to the target identifier. In embodiments of the present disclosure, based on the feature that the network path information cannot be faked, the service terminal can provide the corresponding authorization identifier to the authorized client terminal using the network path information of the authorized client terminal. Thus, the apparatus code can be prevented from being faked to cause the service terminal to send the authorization identifier to the illegal apparatus. Therefore, the security of the application authorization can be improved.

For example, as shown in FIG. 2, the service terminal includes three states, such as an initialization state, an authorization generation state, and an authorization verification state.

Firstly, the service terminal can be in the initialization state after installation of the application. The service terminal can be configured to compute the network path information of itself not limited to an IP address, a gateway address, a DNS address, or a gateway physical address. The network path information of itself can change when the network environment changes.

Secondly, the service terminal can be in the authorization generation state by setting information such as the number of pre-authorized client terminals, and the authorization identifiers of the legal client terminals in the current network environment.

Firstly, after the client terminal 1 is connected to the service terminal, the service terminal can obtain that the network path from the client terminal 1 to the service terminal is 6-3-1-2-5. The service terminal and the client terminal 1 can compute the same upper node such as the network apparatus 1 as the common node through information comparison. Then, the network path information from the common node to the client terminal 1 can be computed. The network path information can be generated according to the identity information of the nodes through which the network path passes, such as the MAC address, and the IP address, which can be combined in sequence to form the network path information of the client terminal 1.

Similarly, the service terminal can generate network path information of the service terminal.

Secondly, the service terminal can obtain the network path information of other client terminals, such as network path information of the client terminal 2 and network path information of the client terminal 3.

Thirdly, the service terminal can perform the XNOR operation on the network path information of each client terminal and the network path information of the service terminal. The string corresponding to the bits of the XNOR result being continuously 1 can be intersected in the network path information according to the operation result. The string can be converted into hexadecimal to generate the authorization identifier.

Fourthly, the service terminal can send the combined information of the public node information and the authorization identifier to the authorized client terminal through asymmetric encryption. The authorized client terminal can calculate the second network path information of itself according to the obtained public node information. The XOR operation can be performed on the second network path information and the authorization identifier that is converted into the binary form. If the results are zeros, it indicates that each bit can be the same, and the verification passes. Otherwise, the verification fails.

Then, the service terminal can be converted into an authorization verification state. In the authorization verification state, the service terminal can receive a plurality of authorization requests from client terminals, and send the authorization identifier according to the following rules.

The authorization information such as the public node information and the authorization identifier can be sent to the client terminals. The authorization identifier cannot be updated in this state. In the execution process, the authorized client terminal can search for whether the authorization information is obtained. If the authorization information is not obtained, then the client terminal can request the authorization information from the service terminal. Then the second network path information can be generated according to the public node information. Then, the XOR operation can be performed on the second network path information and the binary form converted from the authorization identifier. If all bits of the result are zeros, the verification passes. Otherwise, the verification fails.

In summary, in the technical solution of the present disclosure, the authorization identifier can be generated through the network information. Whether authorized can be verified by calculating to generate the authorization mask. Thus, the application can drift in the authorized network environment, which does not affect the generation of the authorization identifier. Based on this, the authorization identifier of the present disclosure may not depend on the physical apparatus, which avoids the impact brought by the virtual hardware. The drift of the running environment of the application may not impact the generation of the authorization identifier. In addition, in the present disclosure, the information such as the number of the authorization can be controlled, and the authorized data can be encrypted and transmitted.

Embodiments of the present disclosure are described in a progressive manner. Each embodiment focuses on differences from other embodiments. The same and similar parts among the embodiments can refer to each other. Since the device of embodiments of the present disclosure corresponds to the method of embodiments of the present disclosure, the description can be simple, and the relevant parts can be referred to the description of the method.

Those skilled in the art can further understand that the units and algorithm steps of the examples described in connection with embodiments of the present disclosure can be implemented by the electronic hardware, the computer software, or a combination thereof. To describe the interchangeability of hardware and software, the composition and steps of embodiments of the present disclosure are described according to functionality. Whether these functions are executed by the hardware or software can depend on the specific application and design constraint conditions of the technical solution. Those skilled in the art can use different methods to implement the described functions. These functions should not be considered out of the scope of the present disclosure.

The steps of the method or algorithm described in connection with embodiments of the present disclosure can be embodied directly in hardware, a software module executed by a processor, or a combination thereof. A software module can be stored in random access memory (RAM), memory, read-only memory (ROM), electrically programmable ROM, electrically erasable programmable ROM, a register, a hard disk, a removable disk, a CD-ROM, or any other form of storage medium known in the art.

The above description of embodiments of the present disclosure can be provided to enable those skilled in the art to implement or use the present disclosure. Various modifications to embodiments of the present disclosure can be apparent to those skilled in the art. The generic principles defined here can be applied to other embodiments without departing from the spirit or scope of the present disclosure. Thus, the present disclosure is not intended to be limited to embodiments of the present disclosure but conforms to the widest scope consistent with the principles and novel features of the present disclosure.

What is claimed is:

1. A data processing method applied to a service terminal, comprising:

receiving an authorization request sent by a target client terminal, the authorization request including target path information of the target client terminal;

searching for a target identifier matching the target path information in an authorization list including at least one authorization identifier, the authorization identifier being generated at least based on network path information of an authorized client terminal, wherein generating the authorization identifier includes calculating the network path information of the authorized client terminal and network path information of the service terminal to obtain the authorization identifier of the authorized client terminal, and wherein:

the network path information of the authorized client includes identity information of one or more network nodes connected in a network path from a target node to the authorized client terminal;

the network path information of the service terminal includes identity information of one or more network nodes connected in a network path from the target node to the service terminal; and the target node is a node determined from common upper nodes of the authorized client terminal and the service terminal; and controlling the target client terminal to run a target application according to the target identifier, including:

controlling the target client terminal to perform verification on the target identifier according to the target node corresponding to the target identifier and run the target application according to an obtained verification result.

2. The method of claim 1, wherein the target client terminal performing the verification on the target identifier according to the target node and control the target application to run according to the obtained verification result includes:

obtaining second network path information of the target client terminal according to the target node;

determining whether the second network path information matches the target identifier; and in response to the second network path information matching the target identifier, obtaining running permission of the target application, wherein the target application is allowed to operate on the target client under the operation authority.

3. The method of claim 1, wherein the target node is selected from a gateway node, a domain name resolution node, and a preset network node in a network where the authorized client terminal and the service terminal are located.

4. The method of claim 1, wherein computing the network path information of the authorized client terminal and the network path information of the service terminal to obtain the authorization identifier of the authorized client terminal includes:

performing a logical operation on the network path information of the authorized client terminal and the network path information of the service terminal to obtain an operation result; and performing conversion on the operation result to obtain the authorization identifier of the authorized client terminal.

5. The method of claim 4, wherein:

performing the logical operation on the network path information of the authorized client terminal and the network path information of the service terminal to obtain the operation result includes:

performing XNOR operation on binary network path information of the authorized client terminal and binary network path information of the service terminal to obtain a binary string corresponding to XNOR result bits that are continuously 1 in the binary network path information; and performing the conversion on the operation result to obtain the authorization identifier of the authorized client terminal includes:

converting the binary string into hexadecimal to obtain the authorization identifier of the authorized client terminal.

6. The method of claim 1, wherein the service terminal and the authorized client terminal are running environments of an application running in a container or a virtual machine.

7. An electronic apparatus, comprising:

a processor; and a memory storing a computer program that, when executed by the processor, causes the processor to perform the operations:

receiving an authorization request sent by a target client terminal, the authorization request including target path information of the target client terminal;

searching for a target identifier matching the target path information in an authorization list including at least one authorization identifier, the authorization identifier being generated at least based on network path information of an authorized client terminal, wherein generating the authorization identifier includes calculating the network path information of the authorized client terminal and network path information of the service terminal to obtain the authorization identifier of the authorized client terminal, and wherein:

the network path information of the authorized client includes identity information of one or more network nodes connected in a network path from a target node to the authorized client terminal;

the network path information of the service terminal includes identity information of one or more network nodes connected in a network path from the target node to the service terminal; and the target node is a node determined from common upper nodes of the authorized client terminal and the service terminal; and controlling the target client terminal to run a target application according to the target identifier, including:

controlling the target client terminal to perform verification on the target identifier according to the target node corresponding to the target identifier and run the target application according to an obtained verification result.

8. The apparatus of claim 7, wherein the processor is further configured to:

obtain second network path information of the target client terminal according to the target node;

determine whether the second network path information matches the target identifier; and in response to the second network path information matching the target identifier, obtain running permission of the target application, wherein the target application is allowed to operate on the target client under the operation authority.

9. The apparatus of claim 7, wherein the target node is selected from a gateway node, a domain name resolution node, and a preset network node in a network where the authorized client terminal and the service terminal are located.

10. The apparatus of claim 7, wherein the processor is further configured to:

perform a logical operation on the network path information of the authorized client terminal and the network path information of the service terminal to obtain an operation result; and perform conversion on the operation result to obtain the authorization identifier of the authorized client terminal.

11. The apparatus of claim 10, wherein the processor is further configured to:

perform XNOR operation on binary network path information of the authorized client terminal and binary network path information of the service terminal to obtain a binary string corresponding to XNOR result bits that are continuously 1 in the binary network path information; and convert the binary string into hexadecimal to obtain the authorization identifier of the authorized client terminal.

12. The apparatus of claim 7, wherein the service terminal and the authorized client terminal are running environments of an application running in a container or a virtual machine.

13. A data processing method applied to a service terminal, comprising:

receiving an authorization request sent by a target client terminal, the authorization request including target path information of the target client terminal;

searching for a target identifier matching the target path information in an authorization list including at least one authorization identifier, the authorization identifier being generated at least based on network path information of an authorized client terminal, wherein generating the authorization identifier includes calculating the network path information of the authorized client terminal and network path information of the service terminal to obtain the authorization identifier of the authorized client terminal, including:

performing a logical operation on the network path information of the authorized client terminal and the network path information of the service terminal to obtain an operation result, including:

performing XNOR operation on binary network path information of the authorized client terminal and binary network path information of the service terminal to obtain a binary string corresponding to XNOR result bits that are continuously 1 in the binary network path information; and performing conversion on the operation result to obtain the authorization identifier of the authorized client terminal, including:

converting the binary string into hexadecimal to obtain the authorization identifier of the authorized client terminal; and controlling the target client terminal to run a target application according to the target identifier.

* * * * *